No. 698,916. Patented Apr. 29, 1902.
A. FILTER.
BREAD CUTTER.
(Application filed Dec. 6, 1901.)
(No Model.)
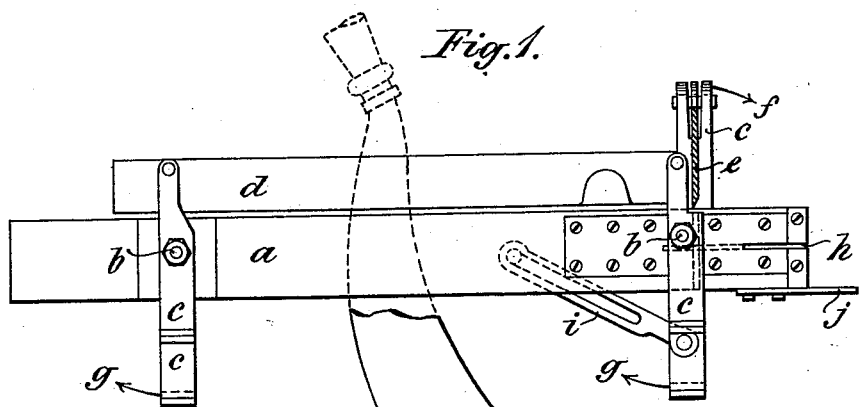
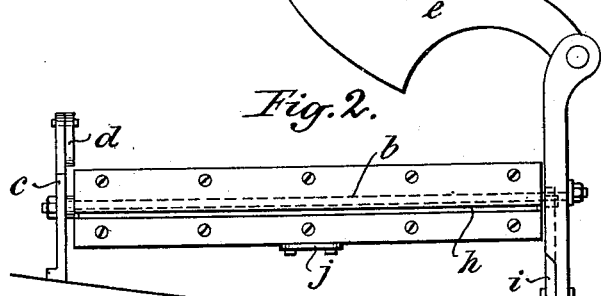
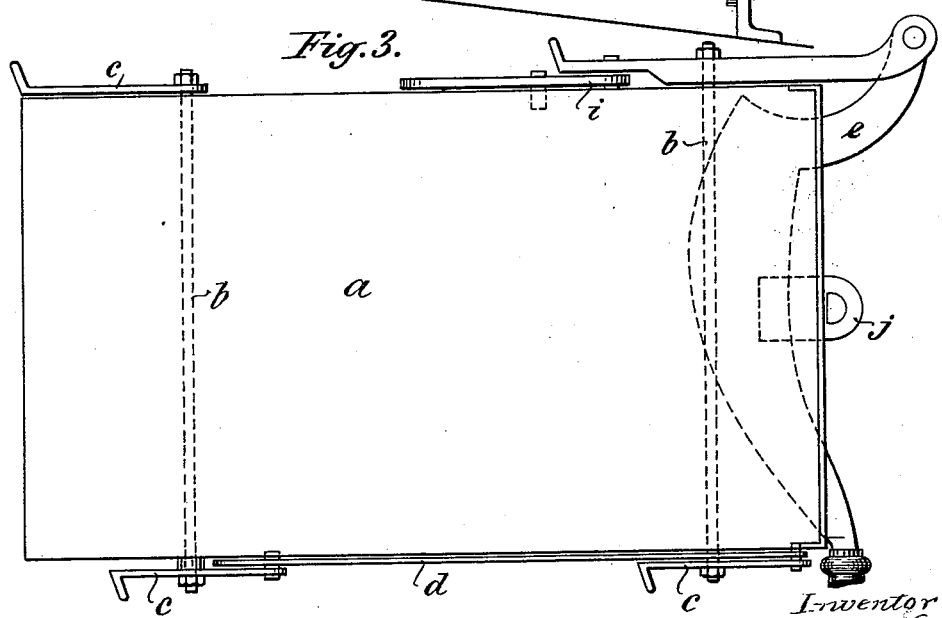

UNITED STATES PATENT OFFICE.

AUGUST FILTER, OF HANOVER, GERMANY.

BREAD-CUTTER.

SPECIFICATION forming part of Letters Patent No. 698,916, dated April 29, 1902.

Application filed December 6, 1901. Serial No. 84,947. (No model.)

*To all whom it may concern:*

Be it known that I, AUGUST FILTER, manufacturer, a subject of the King of Prussia, German Emperor, residing at No. 12 Seidlitz street, Hanover, in the Kingdom of Prussia, German Empire, have invented certain new and useful Improvements in Bread-Cutters, of which the following is a specification.

This invention relates to a bread-cutter in which the supports or feet of the base-plate, the ledge against which the bread is placed in cutting, and the cutting-knife itself are so arranged that they may be moved or turned so as to assume a position parallel to the base-plate, the latter having a horizontal slot into which the thus-turned knife may be put.

My improved bread-cutter is represented in the accompanying drawings, in which—

Figure 1 is a side view of the cutter; Fig. 2, an end view, the knife being raised; and Fig. 3 is a plan of the same.

The base-plate $a$, upon which the bread to be cut is placed, has supports or feet $c$, secured to shafts $b$. Two of the feet extend above the upper surface of the plate $a$ and are connected at their upper ends by a ledge $d$, against which the bread is held while being cut. A third foot, also extending upward, has attached to it the knife $e$, and all the parts thus connected with each other may be moved or turned in the direction of the arrow $f$, Fig. 1, until they are parallel with the plane of said base-plate $a$. This latter has a horizontal slot $h$, located just opposite to the knife when thus turned, and the knife may thus be placed into that slot, so as to prevent people from coming in contact with the sharp edge of the blade when it is out of use. In this state the cutter may be hung to or suspended from the wall of the kitchen or pantry like other utensils necessary in such places. When in working position, the parts are fixed by a feather $i$, and $j$ is an ear for suspending the whole.

Having now described my invention, what I desire to secure by a patent of the United States is—

In a bread-cutter, the combination with a base-plate $a$ having at one end a slot $h$, of feet $c$ having three upwardly-extending elongations, shafts $b$ connecting said feet, a ledge $d$ connecting two of said elongations, and a knife or blade attached to the third elongation, all the movable parts thus connected being adapted to be turned so as to bring the blade opposite, and into, said slot, as set forth.

In witness whereof I have hereunto set my hand in presence of two witnesses.

AUGUST FILTER.

Witnesses:
C. C. STEVENSON,
L. RASCH.